Jan. 8, 1929.
J. C. STEWART
1,698,203
MOVIE LETTER CAMERA
Filed May 7, 1924
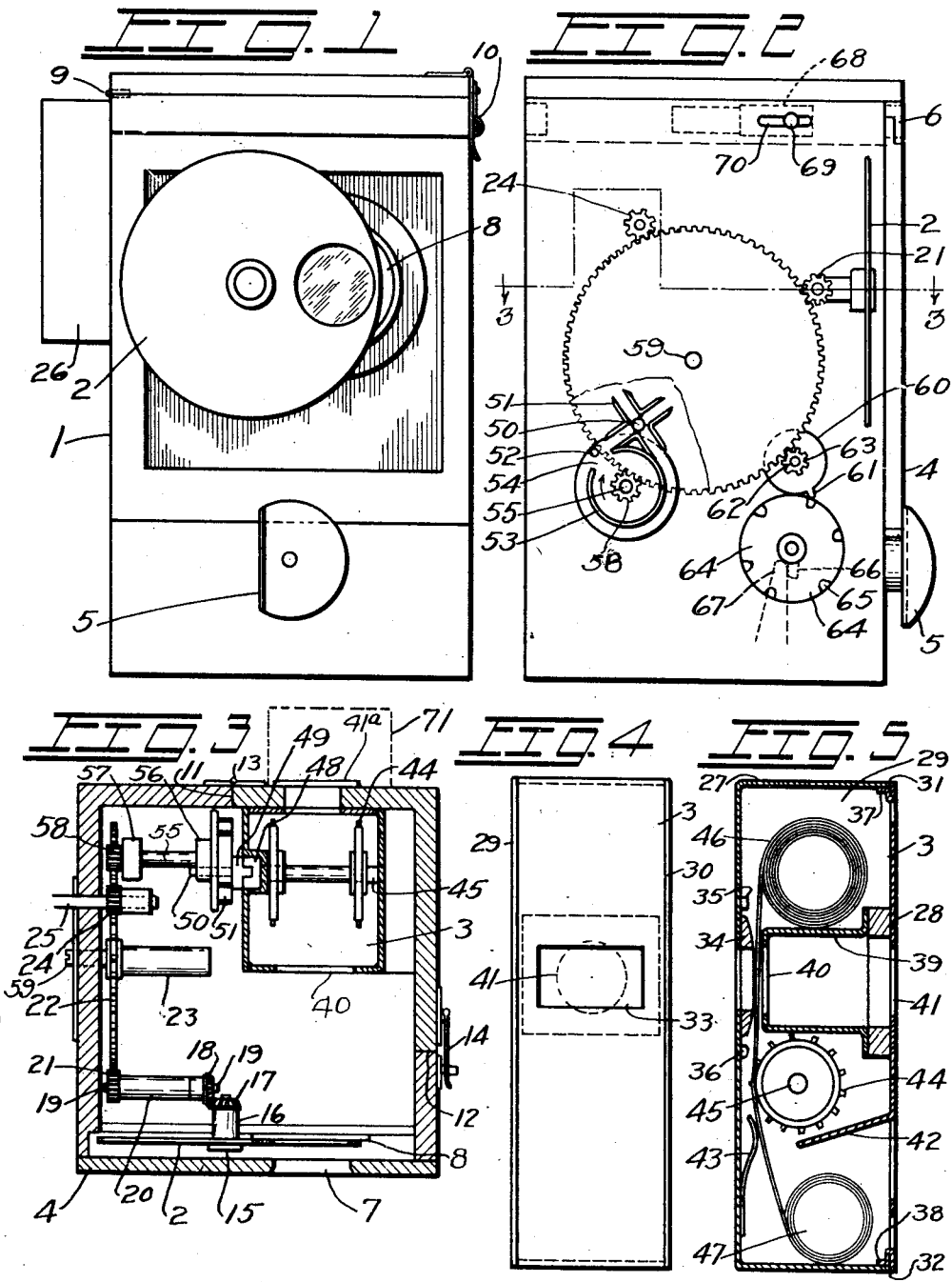
INVENTOR
John C. Stewart
Harry Bowen
ATTORNEY Patented Jan. 8, 1929.

1,698,203

UNITED STATES PATENT OFFICE.

JOHN C. STEWART, OF SEATTLE, WASHINGTON.

MOVIE-LETTER CAMERA.

Application filed May 7, 1924. Serial No. 711,520.

The invention is a miniature moving picture camera for taking short length films which may also be used as a projector to display the films.

The object of the invention is to provide a means for taking short length moving picture films so that a person may take a moving picture instead of writing a description and then remove the film and mail it to another person in order to convey the idea or illustrate the object to him more readily.

Another object of the invention is to provide a simple and efficient device for taking moving pictures or the like.

Another object of the invention is to provide a means for taking moving pictures in which the film is contained in a removable magazine.

A further object of the invention is to provide a removable magazine for a moving picture camera in which a short length of film may be contained and moved across an opening.

And a still further object of the invention is to provide a magazine for moving picture cameras in which the film may be contained which may readily be placed in and removed from the camera and which is provided with a socket that will readily fit over a key so that it may be operated with an intermittent motion in conjunction with the shutter.

With these ends in view the invention embodies a minature moving picture camera having a removable magazine in which the film may be contained and operated, and a means for operating the film in conjunction with the shutter.

Other features and advantages of the invention will be seen from the following description taken in connection with the drawings, wherein:—

Figure 1 is a front view with the cover plate removed.

Figure 2 is a cross section on a line just inside of the side wall of the casing.

Figure 3 is a sectional plan approximately on line 3—3 of Figure 2 with parts omitted and parts broken away.

Figure 4 is a front view of the magazine.

Figure 5 is a vertical cross section through the magazine.

In the drawings I have shown my device as it would be constructed wherein numeral 1 indicates the casing, numeral 2 the shutter, and numeral 3 the film magazine.

The casing 1 may be rectangular or any other suitable shape and may be provided with a cover plate 4 at the front which is held in place by a rotatable clip 5 and a stationary clip 6 at the upper end. The cover plate is provided with an opening 7 in front of the lens which I have indicated by the numeral 8. The upper part of the casing is also provided with a cover which is connected to it by hinges 9 and held in place by a latch 10 as shown in Figure 1. Part of the rear and of one side of the casing is also provided with an opening which is formed by cutting the casing at the points 11 and 12 as shown in Figure 3 and connecting this section to the casing by hinges 13 and a clip 14. It will be seen that the magazine 3 may be removed from the casing by opening this section.

The shutter 2 is rigidly attached to a shaft 15 which is supported in a bearing 16 and provided with a bevel gear 17 which meshes with another bevel gear 18 on a shaft 19 and the shaft 19 which is supported in a bearing 20 is provided with a pinion 21 that meshes with the main driving gear 22. The gear 22 is rotatably supported in a bearing 23 in the casing and driven by a gear 24 on a shaft 25 which extends into the casing from a motor 26 that may be placed on the side of the casing as shown in Figure 1. It is understood that this motor may be of any suitable type and if desired a spring motor similar to a clock or phonograph motor may be used.

The magazine 3 may be stamped from sheet metal as shown in Figure 5 and provided with a cover plate 27, a base plate 28, and side plates 29 and 30. The cover plate will extend from the point 31 shown in Figure 5 to the opposite side of the magazine then downward and then backward to the point 32 and may be provided with a rectangular shaped opening 33 with a guide plate 34 around it which is provided with beveled ends so that it will not scratch the film. The cover is also held in the position shown by lugs 35 and 36 on the sides 29 and 30 which engage the under side of the plate. The ends are held against stops 37 and 38 which are formed by stamping pieces of metal out of the base 3 and bending them backward and upward as shown. A rectangular shaped box 39 with an opening 40 in one side may be placed in the central portion of the magazine as shown in Figure 5. And an opening 41 may be placed in the base in line with the openings 33 and 40 as shown in dotted lines in Figure 4 and also in Figure 5. A guide 42 may also be stamped from the base of the magazine which will extend upward as shown in Figure 5 to prevent the film in this end of the magazine from coming in contact with the sprockets. A spring 43 may be placed on the under side of the cover opposite the guard 42 to hold the film against the sprocket as shown. The back of the casing may be provided with an opening to correspond with the opening 41 of the magazine and a closure as indicated by the numeral 41ª and shown in Figure 3.

Sprocket wheels 44 are mounted on a shaft 45 in the magazine which engage openings in the edges of the film and move the film from one end of the magazine to the other. It will be observed that the film may be contained in the magazine with each end winding upon itself to form rolls as indicated by the numerals 46 and 47 and as the sprockets rotate they will draw the film from one roll and the natural curvature of the film will cause it to wind upon itself or upon the other roll. It will also be observed that when loading the magazine the roll of film may be placed in one end with one end of the film extending across the sprockets so that it will be engaged by them and moved as the sprockets are rotated.

One end of the shaft 45 is provided with a socket 48 as shown in Figure 3 which will engage a key 49 in the casing 1 as the magazine 3 is placed in the casing. Although I have shown a socket and key of this type it is understood that any other suitable means may be used for positively, and at the same time removably, connecting the shaft 45 to a shaft 50 upon which the key 49 is mounted. The grooved member 51 of an intermittent cam is mounted on this shaft 50 and engages a pin 52 and a flange 53 with an opening 54 in it on another shaft 55 which is mounted in bearings 56 and 57 in the casing 1 and rotated by a gear 58 from the main gear 22 which is mounted on a shaft 59. It will be seen that as the cam rotates in the direction of the arrow in Figure 2 the pin 52 will enter one of the slots and the side members of the slot will enter the opening 54 so that the shaft 50 will be rotated a quarter of a turn each time the shaft 55 makes a complete revolution. This will provide an intermittent motion for the film which will be timed through the gears to operate with the shutter 2. It is understood that any other desired motion may be used to provide the intermittent movement of the film.

A wheel 60 with a lug 61 on it is mounted on a shaft 62 as shown in Figure 2, and on this shaft is also a gear 63 which meshes with the main driving gear 22. This wheel 60 is spaced a slight distance from a disc 64 which is provided with notches 65 into which the lug 61 will operate so that the disc 64 will move the distance of one notch as the wheel 60 makes one revolution; and as the speed of the wheel 60 is regulated so that it will operate with the film, the disc 64 may have enough notches to make one complete revolution as the film moves its entire length. A lug 66 may be placed on the hub of the disc 64 which will engage a stop 67 as the disc makes a complete revolution and stop the machine.

A view finder 68 may be placed in the upper part of the casing 1 and arranged so that it may be adjusted or focused to different distances by a knob 69 which projects through a slot 70 in the casing.

It will be observed that the end of the shaft 59 upon which the gear 22 is mounted extends beyond the casing as shown in Figure 3 so that a crank may be placed on it to rotate the gear if desired.

It will be understood that other changes may be made in the construction without departing from the spirit of the invention. One of which changes may be in the design of the casing; another may be in the design of the magazine; and still another may be in the means for operating the film in the magazine in conjunction with the shutter.

The construction will be readily understood from the foregoing description. To use the device it may be assembled as shown and it will be seen that magazines containing film which may be supplied with the camera or purchased independently may readily be inserted or removed from the casing. When it is desired to take a picture a mazagine containing fresh film is placed in the casing and it will be seen that as the shutter is operated either by a crank or the motor the film will operate with it and take the pictures as desired. It will also be seen that after the film is taken the magazine may be removed so that the film may be developed and after it is developed it may be replaced in the machine and projected on a screen by placing a light in a container at the rear of the casing as indicated by the dotted lines 71 as shown in Figure 3.

The magazine is not confined to any particular width of film and has a dual use as it may be used for both negative and positive film as it may be constructed for a film of any width. The negative film may first be exposed, then developed and then replaced in the magazine and projected through the same machine.

Having thus fully described the invention, what I claim as new and desire to secure by Letters Patent, is :—

1. In a motion picture camera, a casing, a removable film magazine having openings at the ends in which the film may wind upon itself, and a common pair of sprockets intermediate of the ends and engaging the sides of the film, means for rotating the said sprockets, an intermittent motion in the said rotating means, a lens, a shutter cooperating with the said lens and means for rotating the said shutter from the said means for rotating the said sprockets.

2. In a moving picture camera, a lens, a shutter, suitable operating mechanism and a removable film magazine having compartments in its ends in which the film may wind upon itself, and means intermediate of the ends for moving the film from one end to the other thereby providing means for holding and operating a short length of film, said magazine being adaptable to operate the film in connection with the operating mechanism of the said camera.

JOHN C. STEWART.